C. L. BROWN.
TRACTOR DEVICE.
APPLICATION FILED OCT. 16, 1917.
1,297,536.
Patented Mar. 18, 1919.
2 SHEETS—SHEET 1.
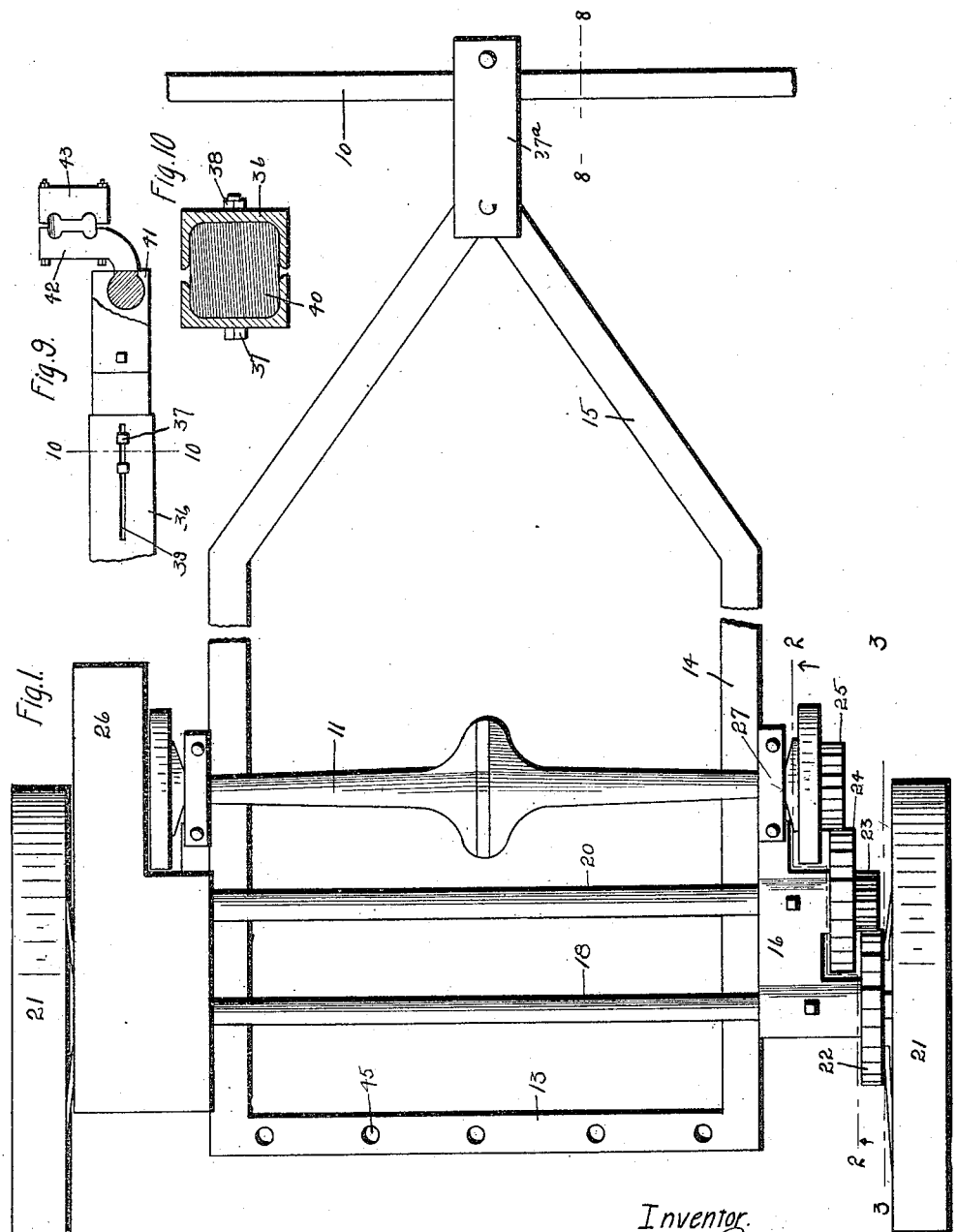
Witness
E. H. Buchanan.
Inventor.
C. L. Brown
By Cruig & Bair ATTYS.

C. L. BROWN.
TRACTOR DEVICE.
APPLICATION FILED OCT. 16, 1917.
1,297,536.
Patented Mar. 18, 1919.
2 SHEETS—SHEET 2.
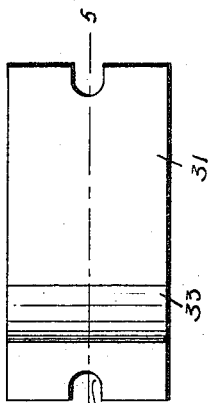
Fig. 4.
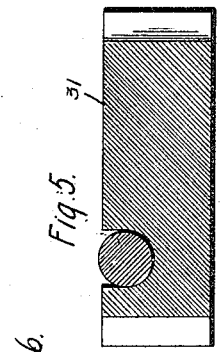
Fig. 5.
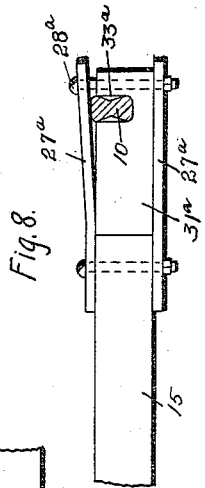
Fig. 8.
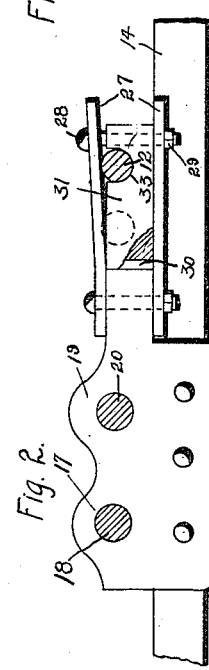
Fig. 2.
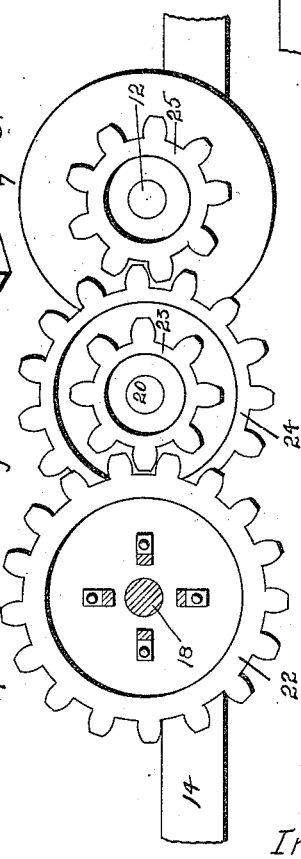
Fig. 6.
Fig. 7.
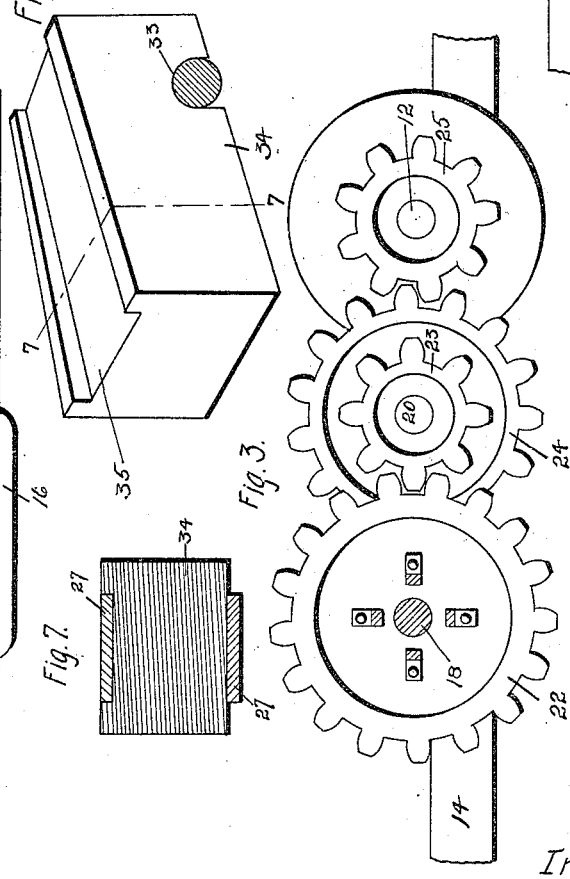
Fig. 3.
Witness
C. H. Buchanan.
Inventor
C. L. Brown
By Orwig & Bair ATTYS

UNITED STATES PATENT OFFICE.

CHAUNCEY L. BROWN, OF NORTHFIELD, MINNESOTA.

TRACTOR DEVICE.

1,297,536. Specification of Letters Patent. Patented Mar. 18, 1919.

Application filed October 16, 1917. Serial No. 196,960.

*To all whom it may concern:*

Be it known that I, CHAUNCEY L. BROWN, a citizen of the United States, and resident of Northfield, in the county of Rice and State of Minnesota, have invented a certain new and useful Tractor Device, of which the following is a specification.

The object of my invention is to provide a device upon which an ordinary automobile, after the removal of the rear wheels, may be mounted for changing the automobile into a tractor.

A further object is to provide such a device so arranged that the tractor wheels may be readily and easily adjustable for running them at different rates of speed with relation to the axle of the automobile, the parts being so arranged that the gears are properly meshed and their supporting axles rigidly held in any of the positions of such adjustment.

A further object is to provide a self contained frame adapted to support an automobile and made so rigid and well braced that it takes the strain from the frame of the automobile leaving the automobile to perform its functions of power transmission and steering only.

Still a further object is to provide such a device having a frame adapted to support the frame of a motor vehicle, and including means for supporting an axle and a countershaft, and for rigidly fixing said frame on the rear axle and means whereby the countershaft and an auxiliary axle may be firmly mounted in proper relation with each other.

Still a further object is to provide such a device having a frame, and having means for mounting the frame on the automobile for securing a proper three point suspension.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a device embodying my invention, the parts of the automobile being shown with the device installed thereon.

Fig. 2 shows a vertical, sectional view taken on the line 2—2 of Fig. 1.

Fig. 3 shows a sectional view taken on the line 3—3 of Fig. 1.

Fig. 4 shows a top or plan view of one of the reversible bearing blocks.

Fig. 5 shows a vertical, central, sectional view through the same, and through an axle resting thereon.

Fig. 6 shows a perspective view of a modified form of one of said blocks.

Fig. 7 shows a transverse sectional view taken through the bearing block shown in Fig. 6.

Fig. 8 shows a detail, sectional view taken on the line 8—8 of Fig. 1.

Fig. 9 shows a side elevation of the front portion of the device illustrated in a modified form, and Fig. 10 shows a transverse, vertical sectional view taken on the line 10—10 of Fig. 9.

In the accompanying drawings, I have used the reference numeral 10 to indicate generally the front axle of an automobile to which my improved device may be attached.

The rear axle housing is indicated by the reference character 11. Within the rear axle housing is the rear axle 12. Only such parts of the automobile as are necessary for illustration are here shown. In using my improved attachment, the rear wheels of the automobile are removed from the axle and my attachment is then mounted on the machine.

My attachment includes a frame comprising a transverse frame member 13 spaced rearwardly from the rear axle 12 and suitably connected with spaced forwardly extending side frame members 14.

Extending forwardly from the forward ends of the frame members 14 and converging at their forward ends are frame members 15.

Different means may be provided for securing the forward ends of the auxiliary frame to the axle 10, which means will be hereinafter described.

Secured to the frame members 14 on the outer sides thereof rearwardly of the axle 12, are castings 16 which are preferably detachably bolted to the frame members 14. The castings 16 are formed with bearings 17 for an auxiliary shaft or axle 18. The castings 16 are also provided with bearings 19 for a countershaft 20.

On the ends of the shaft 18 are tractor wheels 21 on each of which on the side adjacent to the casting 16 is a gear 22.

On the outer ends of the shaft 20 are gears 23 meshing with the respective gears 22. On the shaft 20 at the opposite ends thereof are gears 24 rigidly connected with the respective gears 23, and arranged to mesh with gears 25 on the automobile rear axle. For inclosing the gears just described on each side of the machine gear casings 26 are provided.

For connecting the attachment frame with the rear axle of the machine, I have provided a reversible bearing block and means for supporting the same with relation to the frame.

In the form of the device shown in the drawings, I have shown on each side of the machine bars 27 secured to the castings 16 and extending forwardly in vertically spaced pairs.

The forward ends of each pair of bars 27 are connected by a bolt 28, on which is a nut 29. Each casting 16 is provided at its forward surface with a forwardly extending tongue 30.

Between each pair of bars 27 is an adjustable bearing block, one of which bearing blocks indicated by the reference character 31, is shown in Figs. 2, 4 and 5. Each bearing block 31 is provided at each end with a vertical groove 32. The groove, at one end of the bearing block 31 receives the tongue 30, and at the other end receives the bolt 28, whereby the bearing block 31 is firmly held against any horizontal movement with relation to the frame of the attachment.

The bearing block 31 is provided with a transverse groove 33 which in one position of the block 31 is on its upper surface, and in another position may be on its lower surface. The groove 33 is also located closer to one end of the bearing block 31 than to the other.

In Fig. 2 I have shown the bearing block 31 arranged in such position that the groove 33 is on its upper surface and near its forward end. The groove 33 serves as a bearing for the axle 12.

It will readily be seen that by turning the bearing block 31 over, the groove 33 may be so arranged that it will be located either at the bottom or top of the block, for thereby varying the height of the automobile frame somewhat with relation to the height of the auxiliary frame, or attachment frame; also by inverting the block end for end, the position of the axle 12 with relation to the axle 18 may be varied.

The purpose of the last described adjustment of the bearing block is to permit the removal of the gear 25, and the substitution of a different size therefor, for securing a different gear ratio between the axle 12 and the axle 18.

In Fig. 6 I have shown a modified form of the bearing block indicated by the reference character 34. The bearing block 34 has the bearing groove 33 similar to that of the bearing block 31, but does not have the grooves 32. The bearing block 34 has in that surface which may form either the top or bottom of the bearing block, depending upon its position, a longitudinally arranged channel 35, designed to receive one of the bars 27 for thereby holding the bearing block 34 against horizontal movement.

In Figs. 1 and 8 I have shown a means for securing the forward end of the attachment frame to the axle 10 which is similar to the means already described for mounting the frame on the rear axle of the automobile, said means comprising vertically spaced bars 27ª secured to the forward ends of the frame members 15 and extending forwardly therefrom, and the bars 27ª are connected at their forward ends by means of a bolt 28ª similar to the bolt 28. The bars 27ª receive between them a bearing block 31ª similar to the bearing block 31, having in one surface a transverse groove 33ª similar in general form to the groove 33, but adapted to receive and substantially fit the axle 10.

In Figs. 9 and 10, I have shown a modified form of the means for connecting the forward end of the attachment frame to the front automobile axle 10 which modified form of said means is constructed as follows:

In the modified form of the device just mentioned, the forward ends of the frame members 15 are provided with substantially parallel forwardly extending, inwardly opening channel-shaped members 36, spaced from each other and connected together by bolts 37 and nuts 38. The bolts 37 extend through longitudinally elongated slots 39 in the walls of the channel-shaped members 36. The forward ends of the channel-shaped members 36 receive between them a draw bar 40 through which the bolts 37 extend.

At the forward end of the draw bar 40 is a ball and socket joint 41.

Formed on one member of the ball and socket member 41 is a bearing member 42 designed to receive the rearward half of the axle 10. A corresponding opposite bearing member 43 receives the forward half of the axle 10 and is bolted to the bearing member 42. By the construction just described, I have provided a flexible connection between the forward end of the attachment frame and the front automobile axle, and for thereby insuring a flexible three point suspension for the auxiliary frame which forms part of my attachment.

In the practical use of my improved attachment, the parts are assembled and installed as hereinbefore described. If it is desired to do heavy work in the field, a large sized pinion or gear 25 is employed, and the reversible bearing blocks are so adjusted and arranged as to place the grooves which receive the axle 12 near the forward ends of said blocks.

If it is desired to secure greater speed for drawing a truck along the rod or otherwise, the gears 25 are removed, the reversible bearing blocks are reversed for mounting the axle near the rearward portion of the blocks and smaller gears 25 are installed.

It will be understood that if the front end of the frame is connected with the front axle by means of a reversible bearing block, the forward bearing block must be reversed, when the rear blocks are reversed.

If the form of connection shown in Fig. 9 is employed the nuts 38 are loosened when it is desired to make an attachment, and the frame members 36 are adjusted longitudinally of the machine to accomplish the adjustment, whereupon the nuts 38 are tightened and the frame may be rigid.

It will be seen that some flexibility is allowed where the form of the device shown in Fig. 9 is employed, and a true three point suspension is secured.

The gears at the rear end of the machine are inclosed in the gear casing 26, which may be partially filled with oil if desired. It will be seen that the auxiliary frame is of simple and inexpensive construction, and that the castings 16 may be mounted at different points thereon, for making it possible to use the same frame on a variety of makes of automobiles.

The castings form means for supporting the axle 18, the countershaft 20, and so connected with the axle 12 as to always hold the gears 22, 23, 24 and 25 properly in mesh.

It may be noted that the rear transverse frame member 13 is provided with a plurality of openings 45, whereby said frame member forms a draw bar to which a plow or the like may be secured at different points.

The arrangement of my device is such that the gear ratios may be quickly and easily changed, and yet the gears may be held properly in mesh at all times. This is an important feature of structure owing to the severe strain to which the parts are subjected.

Some changes may be made in the construction and arrangement of the various parts of my improved device without departing from the essential features and purposes of my invention, and it is my intention to cover by my claims any such modified forms of structure or use of mechanical equivalents as may be included within their scope.

I claim as my invention:

1. In a device of the class described, a frame, an axle thereon, traction wheels on said axle, a countershaft on said frame, gearing devices designed to be mounted on the axle of an automobile after the removal of the rear wheels therefrom, means for operatively connecting said gearing devices with said tractor wheels, means for detachably attaching said frame to the front and rear axles of an automobile, whereby said first gearing devices in different sizes may be mounted on the automobile axle, and properly connected with the tractor wheels for securing different gear ratios between the automobile axle and said tractor wheels, said means including reversible bearing blocks for the automobile axle having journal openings off center vertically.

2. In a device of the class described, a frame, a shaft thereon, tractor wheels on said shaft, a countershaft on said frame, gearing devices designed to be mounted on the rear axle of an automobile, detachable means for attaching the front portion of said frame to the front axle of an automobile, adjustable means for attaching said frame to the rear axle of an automobile, said last named means including reversible bearing blocks, for mounting the frame on the rear axle at different points in the length of the frame.

3. In a device of the class described, a frame, a shaft thereon, tractor wheels on said shaft, a countershaft on said frame, gearing devices designed to be mounted on the rear axle of an automobile, detachable means for attaching the front portion of said frame to the front axle of an automobile, adjustable means for attaching said frame to the rear axle of an automobile, said last named means including reversible bearing blocks, for mounting the frame on the rear axle at different points in the length of the frame, said bearing blocks being so constructed that they may be adjusted for varying the height of the automobile rear axle with relation to the frame, and also for varying the position of said rear axle longitudinally of said frame.

4. In a device of the class described, a frame, an axle thereon, traction wheels on said axle, a countershaft, gearing devices on said countershaft, operatively connected with said traction wheels, gearing devices designed to be mounted on the rear axle of an automobile after the removal of the rear wheels therefrom, means for operatively connecting the gearing devices on the rear axle with the countershaft, means for detachably attaching said frame to the rear and front axles of an automobile, said means including reversible bearing blocks on said frame for receiving said rear axle.

5. In a device of the class described, a frame, an axle mounted in said frame, traction wheels on said axle, a countershaft mounted on said frame, gearing devices on said countershaft operatively connected with said traction wheels, gearing devices designed to be mounted on the rear axle of an automobile after the removal of the rear wheels therefrom, means for operatively connecting said last named gearing device with the gearing devices of the countershaft, means for connecting said frame with the rear axle of an automobile, said means including reversible bearing blocks whereby said automobile axle may be mounted on the frame at different points in the length thereof, and means for detachably mounting the free end of said frame on the front axle of an automobile.

6. In a device of the class described, a frame, gearing devices mounted thereon, means including reversible bearing blocks for connecting said frame with the rear axle of an automobile, interchangeable means for connecting the gearing devices on said frame with the power plant of an automobile, including reversible bearing blocks on said frame for receiving said rear axle.

Des Moines, Iowa, October 4, 1917.

CHAUNCEY L. BROWN.

Copies of this patent may be obtained for five cents each, by addressing the "Commissioner of Patents, Washington, D. C."